Patented Sept. 6, 1932

1,875,982

UNITED STATES PATENT OFFICE

ERNEST R. BOLLER, OF ARDEN, DELAWARE, ASSIGNOR TO E. I. DU PONT DE NEMOURS & COMPANY, OF WILMINGTON, DELAWARE, A CORPORATION OF DELAWARE

PREVENTION OF CORROSION

No Drawing. Application filed August 15, 1931. Serial No. 557,381.

This invention relates to the inhibition of corrosion and more particularly to the inhibition of corrosion of apparatus employed in the handling, transportation, and storage of ammonia-carbon dioxide-containing solutions, such as urea synthesis melts or similar compositions.

It is well known that when ammonia and carbon dioxide in the molal ratio of 2:1, or with an excess of ammonia if desired, and/or compounds of these substances, with or without water, are heated under pressure in a closed vessel a partial conversion to urea takes place. The reaction mixtures which, for convenience, will be referred to as urea synthesis melts may vary widely in composition with varying proportions of reactants and/or with the extent to which conversion to urea has taken place.

It has been found that solutions containing ammonia and carbon dioxide, and/or compounds thereof, such as these urea synthesis, melts and similar compositions, comprising varying proportions of urea, ammonia, carbon dioxide, and water, when in contact with apparatus constructed of ferrous materials, exert a deleterious corrosive effect thereupon. Due to this corrosive action, which is considerably greater in the presence of air, it has heretofore been necessary in the handling of urea synthesis melts to resort to the use of noble metals, highly expensive alloys or to equally expensive lined equipment that are not appreciably attacked. This has had the effect of placing an uneconomical cost disadvantage upon the handling of such materials.

With a view to avoiding the serious corrosion problem above outlined and thereby making possible the utilization of relatively inexpensive ferrous materials, it is an object of this invention to provide a method for inhibiting corrosion of said materials which are subject to contact with ammonia-carbon dioxide-contaning solutions particularly urea synthesis melts and similar compositions.

Further objects and advantages of the invention will be apparent by reference to the following specification wherein its details and preferred embodiments are described.

I have discovered that the corrosion of ferrous materials subject to contact with ammonia-carbon dioxide-containing solutions such as urea synthesis melts, or modifications thereof, in the presence or not of air, can be greatly reduced by adding to said solution a relatively small amount of a substance which, when dissolved therein, gives negatively charged colloidal particles.

Although I do not limit myself to any explanation or theory as to the modus operandi of the invention, it would appear that in an ammonia-carbon dioxide-containing solution to which a substance of the character described has been added, the negatively charged colloidal particles thereof are coagulated by the positive metallic ions going into solution when the metal begins to corrode, and there is thus formed an impervious coating on the metallic surfaces which prevents further attack. Thus I have discovered, among others, that the proteins, such as gelatin, casein, blood albumin, agar-agar, and glue, and those metallic hydroxides or salts which give negatively charged colloidal particles in these solutions as for example, sodium ferrocyanide, potassium ferricyanide, sodium silicate, sodium chromate, cobaltous hydroxide, nickel cyanide and potassium permanganate, will inhibit corrosion of ferrous materials. I have observed for example that sodium chromate is reduced in this solution to chromic hydroxide, which gives negatively charged colloidal particles and potassium permanganate is reduced to manganese dioxide, all or part of which goes into colloidal solution.

By elimination of corrosion of ferrous materials according to this invention, it is economically practical to employ mild steel as a material of construction for apparatus utilized in the handling, storage, and transportation of ammonia-carbon dioxide-containing solutions such as urea synthesis melts.

I have found that urea synthesis melts containing sulfide, such, for example, as those melts produced from ammonia and from the usual commercial carbon dioxide containing slight amounts of hydrogen sulfide, exert a particularly undesirable sulfiding and corrosive action upon ferrous materials such as mild steel.

As a further feature of my invention I have discovered that the corrosion of ferrous materials subject to contact with urea synthesis melts, and due to the corrosive action of said melts per se as well as to the sulfiding caused by the free sulfide present in the melt, may be inhibited by the addition to such melt of a substance or substances which exert an oxidizing action upon the free sulfide and also give negatively charged colloidal particles. As substances possessing the property of exerting an oxidizing action upon the free sulfide and giving negatively charged colloidal particles, there may be cited, sodium dichromate, potassium ferricyanide and potassium permanganate.

It would appear that this is due to the oxidizing action of the substances added upon the sulfide present in the melt, after which oxidation the added substance gives negatively charged colloidal particles which prevent corrosion of the mild steel as hereinbefore described. Thus, I have observed in the case of potassium ferricyanide that the concentration required is approximately that calculated on the assumption that it is reduced to ferrocyanide by the sulfide.

If it is desired to utilize substances giving negatively charged colloidal particles which do not oxidize the free sulfide, such for example as sodium silicate, gelatin, agar-agar, and the like, it is also necessary to add a substance which will oxidize the sulfide and whose reduction products are not characterized by a deleterious action upon the negatively charged colloidal particles, such for example as hydrogen peroxide.

Under certain conditions I have found that copper, used as an inhibitor of corrosion of chromium steels subject to contact with urea synthesis melts at elevated temperatures, will plate out upon ferrous materials with which the melts contact. Thus, for example, I have found that there is a tendency toward copper plating upon mild steel which is favored by low carbon content, the absence of air, relatively high temperatures, and by the presence of sulfide.

As another feature of my invention I have discovered that the plating of copper upon mild steel apparatus employed in handling urea synthesis melts containing dissolved copper, such as urea synthesis melts containing dissolved copper as are disclosed in copending application Serial No. 552,795 of Harry C. Hetherington, may be prevented by the addition to said melt of substances included within the group of materials giving negatively charged colloidal particles, such as above described, and which will substantially reduce the copper ion concentration in the melt. Thus, for example, I have found that small quantities of potassium permanganate, potassium dichromate, sodium silicate, and potassium ferricyanide, will inhibit the plating of copper contained in the urea synthesis melt.

Furthermore, I have found that in urea synthesis melts containing both sulfide and copper the addition of a substance giving negatively charged colloidal particles, such as, for example, sodium silicate, potassium ferricyanide, sodium dichromate, or the like, will prevent both the deposition of copper and the precipitation of metallic sulfide.

Although it will be understood that the invention is susceptible of considerable variation in practice, particularly with regard to the specific proportions of materials used in inhibiting corrosion as well as the detailed conditions of operation, the following examples will serve to illustrate the preferred procedure.

*Example 1.*—To a modified urea synthesis melt comprising 34.6% by weight of urea, 24.7% ammonia, 30.5% water, and ammonia and carbon dioxide equivalent to 10.2% ammonium carbamate there was added about 0.05% agar-agar. This solution, ordinarily corrosive to ferrous materials in the absence of agar-agar, was placed in contact with mild steel. No appreciable corrosion at ordinary temperatures was perceptible at the end of two weeks.

In a like manner about 0.04% by weight of sodium silicate, 0.15% gelatin, 0.02% casein, 0.20% blood albumin, 0.20% glue, 0.10% sodium ferrocyanide, 0.10% potassium ferricyanide, 0.01% sodium dichromate, 0.10% cobaltous hydroxide, 0.09% nickel cyanide, 0.10% bismuth as the nitrate, or 0.10% manganese as potassium permanganate, were added in the above proportions to a urea synthesis melt hereinbefore described and no corrosion was perceptible after two weeks when in contact with mild steel at ordinary temperatures.

*Example 2.*—To a modified urea synthesis melt comprising 41.5% by weight of urea, ammonia and carbon dioxide equivalent to 23.2% ammonium carbamate, 5.0% ammonia and 30.3% water was added about 0.05% sodium dichromate. This solution, ordinarily corrosive to ferrous materials in the absence of sodium dichromate, was placed in contact with mild steel. No appreciable corrosion was perceptible at the end of ten days at 100° C.

In a like manner about 0.25% by weight of potassium ferricyanide, and also 0.08% of potassium permanganate, were added in the above proportions to separate urea synthesis melts as hereinbefore described and no corrosion was perceptible after ten days when in contact with mild steel at 100° C.

Various changes may be made in the details of operation or in the proportions of materials used in the invention without departing therefrom or sacrificing any of the advantages thereof.

I claim:

1. The process of preventing corrosion of ferrous materials subject to attack by urea synthesis melts which comprises adding to said melt a substance which, in solution therewith, produces negatively charged colloidal particles.

2. A composition of matter comprising a urea synthesis melt and a substance which in solution therewith produces negatively charged colloidal particles.

3. A composition of matter comprising a solution containing ammonia and carbon dioxide, together with a substance which in said solution produces negatively charged colloidal particles.

4. The method of inhibiting corrosion of ferrous materials subject to contact with urea synthesis melts which comprises introducing into said urea synthesis melt a substance which in solution therewith gives negatively charged colloidal particles.

5. The process of preventing corrosion of ferrous materials subject to attack by urea synthesis melts which comprises adding sodium silicate to said melt.

6. The process of preventing corrosion of ferrous materials subject to attack by urea synthesis melts which comprises adding glue to said melt.

7. The process of preventing corrosion of ferrous materials subject to attack by urea synthesis melts which comprises adding sodium dichromate to said melt.

8. A composition of matter comprising a urea synthesis melt containing sodium silicate.

9. A composition of matter comprising a urea synthesis melt containing glue.

10. A composition of matter comprising a urea synthesis melt containing sodium dichromate.

11. A composition of matter comprising a compound of ammonia and carbon dioxide, urea, water and sodium silicate.

12. A composition of matter comprising a compound of ammonia and carbon dioxide, urea, water, and glue.

13. A composition of matter comprising a compound of ammonia and carbon dioxide, urea, water, and sodium dichromate.

In testimony whereof I affix my signature.

ERNEST R. BOLLER.